No. 817,832. PATENTED APR. 17, 1906.
C. G. BACKUS & G. L. WALLACE.
ELECTROPLATING TANK.
APPLICATION FILED JULY 27, 1905.
3 SHEETS—SHEET 1.
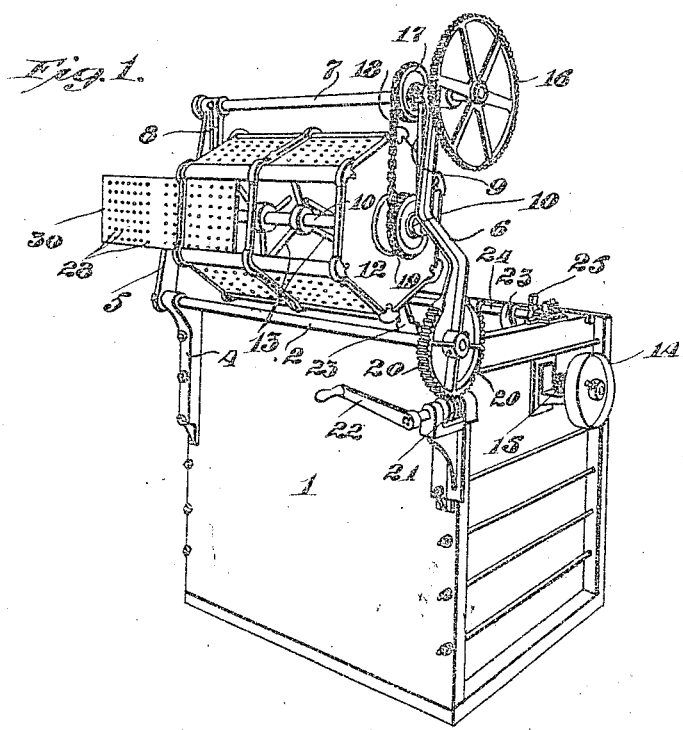
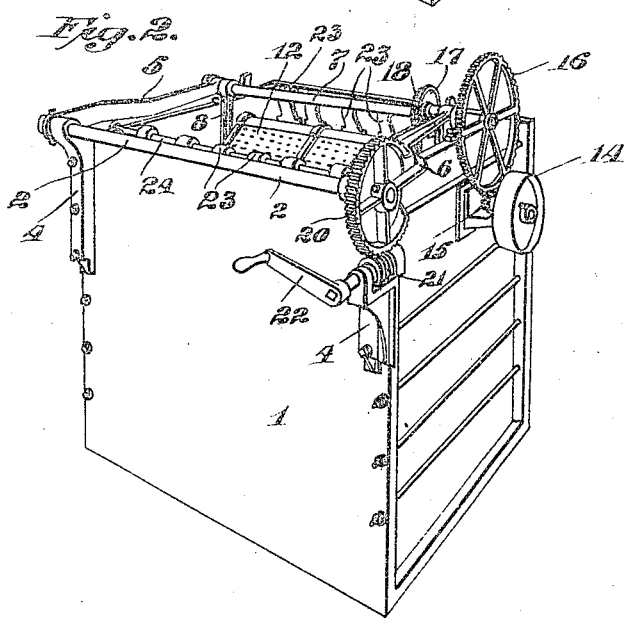
Attest:
Inventors
Clarence G. Backus
George L. Wallace
by ......... Attys

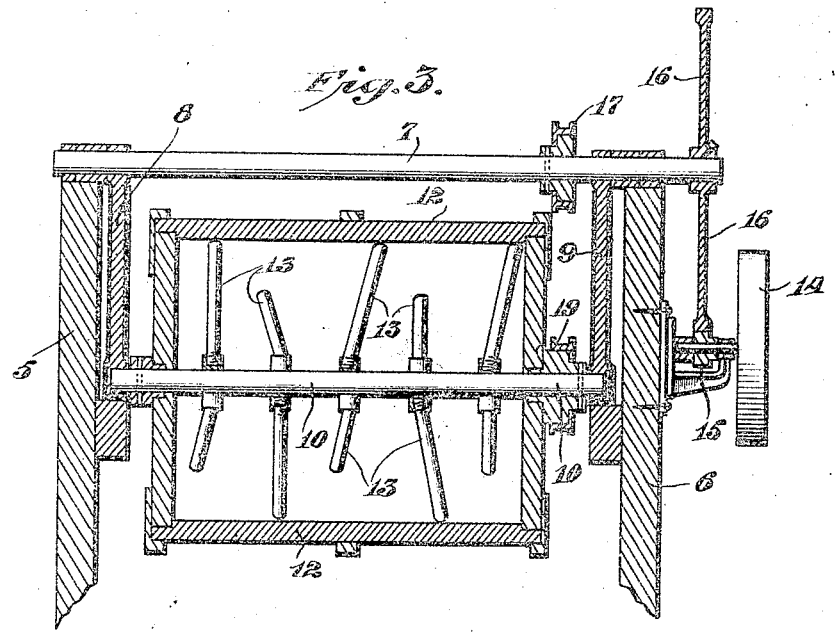
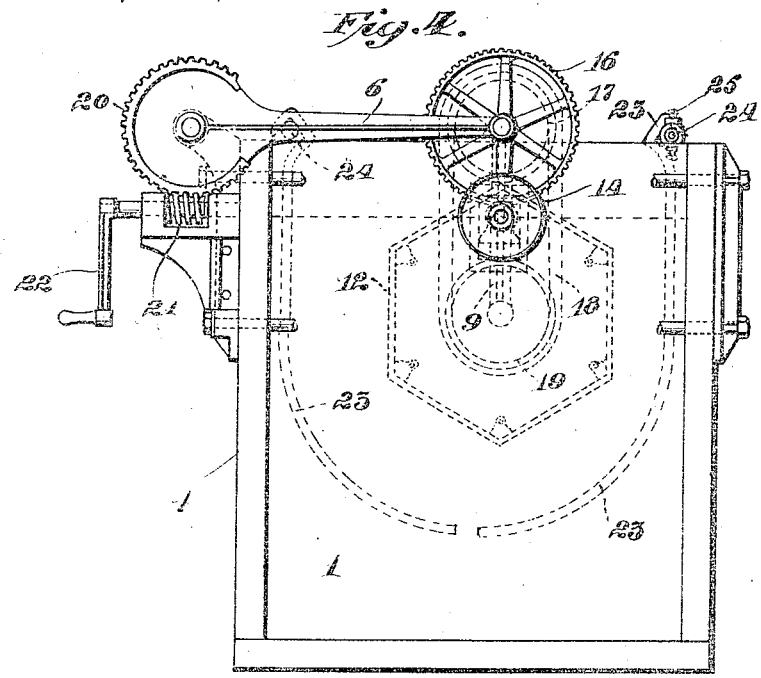

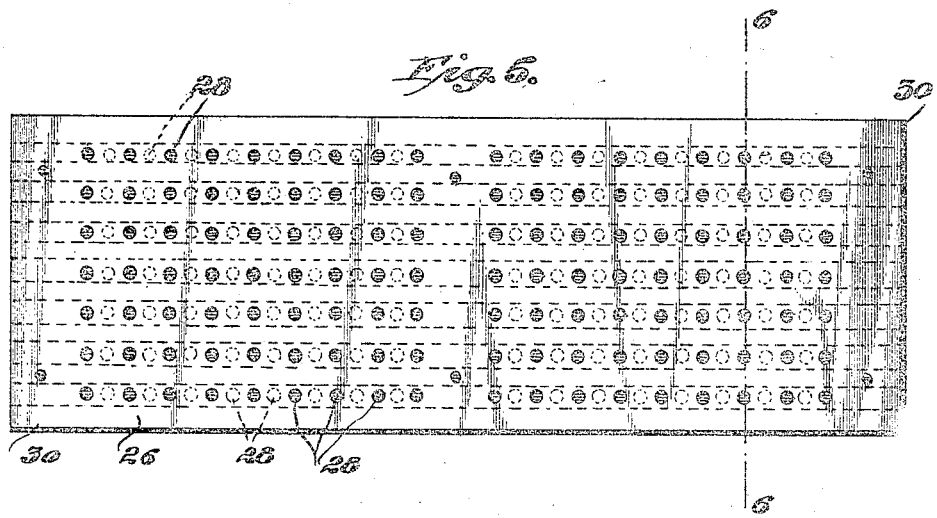
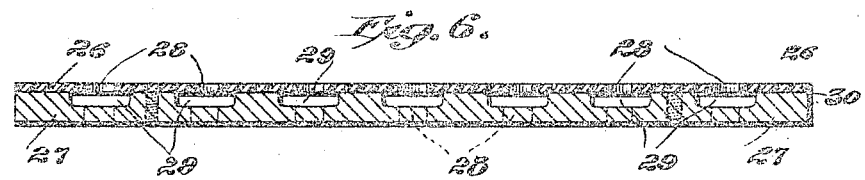
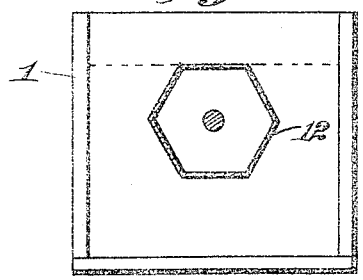
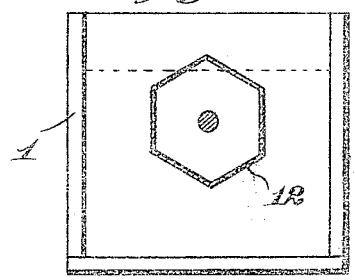

UNITED STATES PATENT OFFICE.

CLARENCE G. BACKUS AND GEORGE L. WALLACE, OF NEW YORK, N. Y., ASSIGNORS TO ZUCKER & LEVETT & LOEB COMPANY, OF NEW YORK, N. Y., A CORPORATION OF NEW YORK.

ELECTROPLATING-TANK.

No. 817,832.    Specification of Letters Patent.    Patented April 17, 1906.

Application filed July 27, 1905. Serial No. 271,405.

*To all whom it may concern:*

Be it known that we, CLARENCE G. BACKUS and GEORGE L. WALLACE, citizens of the United States, and residents of the borough of Manhattan, city, county, and State of New York, have invented certain new and useful Improvements in Electroplating-Tanks, of which the following is a specification.

Our invention relates to electroplating-tanks adapted to plate a large number of small articles at the same time and to such tanks comprising a rotatable receptacle immersed or partially immersed in the electroplating solution and adapted to receive the articles to be plated.

The objects of our invention are to produce a device of this kind which will be cheap to manufacture, efficient in operation, easy to operate, especially when inserting and removing the articles to be plated or which have been plated, and, further, to produce such a device as will not be liable to be damaged by the articles while being plated and as will not break and damage the articles themselves, and, further, to so arrange the electrodes in the solution that there will always be a uniform distribution of the current throughout the fluid surrounding the articles being plated. We attain these objects by the mechanism illustrated in the accompanying drawings, which constitutes a preferred embodiment of our invention, and in which—

Figure 1 is a perspective view of the complete apparatus, showing the drum raised and in a position to be charged with articles to be plated. Fig. 2 is a similar view showing the drum lowered into the normal position for operation. Fig. 3 is a sectional view and shows the interior of the drum and the way in which it is mounted. Fig. 4 is an end view of the apparatus and shows the drum lowered into its operative position. Fig. 5 is a plan view of one of the boards which form the side members of the rotatable drum. Fig. 6 is a sectional view taken on lines 6 6 of Fig. 5. Figs. 7 and 8 are diagrammatic views of the tank and drum.

Similar numerals refer to similar parts throughout the several views.

1 designates the solution-tank, which is shown as a square box and which is preferably formed of wooden boards. Mounted on one side and at the upper edge of the tank 1 is a shaft 2, journaled in the supports 4. The arms 5 and 6 are rigidly carried by the shaft 2. At their outer ends these arms 5 and 6 carry a horizontal shaft 7. The shaft 7 carries the arms 8 and 9, which are loosely hinged at one end to the same, so that they may readily swing in a pendulum fashion. These arms may be covered with hard rubber or a similar substance, so that they will not be acted upon by the solution in the tank. The shaft 10, carrying the angular drum 12, is loosely mounted in the lower ends of the arms 8 and 9, and this shaft where it penetrates the interior of the drum is provided with numerous spokes 13 13, which are distributed throughout the length of the drum and are placed at various inclinations to the shaft, so that they will more thoroughly stir up the articles while they are being plated and while the drum is being rotated.

The angular or prismoidal drum 12 is rotated by means of the following mechanism: The pulley 14 is adapted to receive the driving-belt and transmits motion through the pinion 15, gear-wheel 16, sprocket 17, chain 18, and sprocket 19 to the drum. It is obvious that the drum can be driven by the pulley 14 only when the drum is in its lowest and operative position, so that the gear-wheel 16 will be in mesh with the pinion 15.

The end of the arm 6 attached to the shaft 2 carries a segment of a worm-wheel 20 in mesh with an endless screw 21, adapted to be operated by the crank 22. It will be readily seen that by turning this crank the operator may raise the drum from the operative position (shown in Fig. 2) out of the tank and may cause it to assume a position over one edge of the tank or entirely to one side of the tank, so that the drum may readily be emptied. It will also be seen that the arms 8 and 9 will remain in a vertical position irrespective of the position of the arms 5 6 and that the drum when over the edge of the tank will be in close proximity to the same and will not be raised to such a height as to make it inconvenient for the operator to insert or remove the work. The endless screw and worm-gear are self-locking—that is to say, the worm-wheel cannot drive the endless screw—and whenever the operator raises the drum to a desired position it will be maintained in that position independently of any other locking devices. This is a material advantage in a device of this kind, where the drum frequently has to be raised and lowered. The electrodes 23 23 are arranged on each side of the drum and are suspended from conductor-bars 24. These electrodes are curved, as shown in Fig. 4, so as to closely conform to the curvature of the plating-drum. They do not meet at their lower ends, and there is left between these ends a small gap through which the sediment which tends to accumulate on the electrodes may fall.

25 designates an electrical contact which when the drum is lowered engages the arm 9, which is in electrical contact with the shaft 10 and spokes 13. In operation the current passes from the conductor-bars 24 to the electrodes 23, through the solution and the articles in the plating-drum, to the spokes 13, shaft 10, arm 9, and to the contact 25.

The boards 30, forming the walls of the rotatable drum, as shown in Figs. 5 and 6, are formed of two thin sections 26 and 27, and these are each provided with a large number of small openings 28, and the section 27 is provided with longitudinal channels 29. Sections 26 and 27 are secured together in such a way that the openings in the sections do not stand opposite each other, but are staggered, and are in communication with each other through the channels 29. With this construction it is impossible for the articles being plated to become fastened in the openings and to damage the boards or to be broken. In the ordinary construction where the holes penetrate directly through the side walls of the rotatable drum the articles frequently become engaged in the holes and loss due to breakage is considerable. We have illustrated the section 26 as formed of hard rubber and the section 27 of wood. However, the materials out of which the sections are made may be varied, and while it is preferable to have the inner section made of wood or some substance which will not readily be broken by the articles in the plating-tank and the outer section of some material which is not readily acted on by the plating solution we do not care to be limited to sections composed of wood and hard rubber or of any particular substances, as these may be varied. It will also be seen that owing to the prismoidal or angular form of the drum 12 and its relation to the surface of the liquid, as indicated in Figs. 7 and 8, the revolutions of the drum will cause the angles to project above the liquid at their highest points. This will cause the electroplating solution to flow into and out of the drum, and thereby cause a constant renewing and circulation of the liquid within the drum and around the articles being coated. This feature is of especial advantage because the metallic component of the solution in the vicinity of the articles being plated is quickly exhausted, and unless fresh solution is introduced about the articles the operation of electroplating is much retarded. Also when a strong current is used in plating hydrogen gas is evolved and if allowed to remain in the drum also retards the process.

The operation of our device is obvious from the foregoing description.

While we have described one particular embodiment of our invention, we are aware that changes may be made in the same by those skilled in the art without involving invention and without departing from the spirit of our invention, and we desire to secure protection from all such changes.

What we claim is—

1. In a device of the kind described, a tank, arms attached at one end to a side of the same and a rotatable drum supported by the outer ends of said arms, and means for raising said drum out of said tank and lowering it on one side of the tank substantially as described.

2. In a device of the kind described, a tank adapted to contain a liquid, arms hinged at one end to a side of the same and a rotatable receptacle supported by the other ends of said arms and adapted to be entirely submerged in said liquid substantially as described.

3. In a device of the kind described, a tank, arms hinged at one end to a side of the same and supporting at the other end a second set of arms hinged thereto and a rotatable drum supported at the ends of said second set of arms substantially as described.

4. In a device of the kind described, a tank, arms hinged at one end to a side of the same, a rotatable drum supported by the outer ends of the same and a crank mounted on the side of the tank and combined with transmitting mechanism to raise and lower the drum substantially as described.

5. In a device of the kind described, a tank, arms hinged at one end to a side of the same, a rotatable drum supported by the outer ends of the same, a worm-wheel in engagement with one of said arms and an endless screw in engagement with said worm-wheel, substantially as described.

6. In a device of the kind described, a tank adapted to contain a liquid, a rotatable drum mounted on said tank and adapted to rotate in the said liquid, means for raising said drum out of said tank and to one side of the same, said means comprising self-locking mechanism for retaining the drum at any desired elevation, substantially as described.

7. In a device of the kind described a rotatable receptacle, comprising boards forming the side walls thereof, said boards being formed of two layers secured directly to each other, one layer being of wood and the other of hard rubber, and perforations in said boards formed by oppositely-disposed staggered openings connected with each other, by channels, the said openings and channels forming passage-ways through the boards, substantially as described.

8. In a device of the kind described, a tank adapted to contain a liquid and a rotatable drum mounted on said tank and adapted to be entirely submerged in said liquid and to rotate therein means for raising said drum out of said liquid and to one side of the tank and means for retaining it at any intermediate position substantially as described.

9. In a device of the kind described a rotatable receptacle, comprising boards forming the side walls thereof, said boards being formed of two layers secured directly to each other, one layer being of strengthening material and the other of waterproof material, and perforations in said boards formed by oppositely-disposed staggered openings connected with each other by channels, said openings and channels forming passage-ways through the boards, substantially as described.

In testimony whereof we have signed our names to this specification in the presence of two subscribing witnesses.

CLARENCE G. BACKUS.
GEORGE L. WALLACE.

Witnesses:
ARTHUR W. BUSH,
HARRY A. NOVAK.